June 9, 1925.

J. S. ADAMS

HEADLIGHT MOUNTING

Filed July 13, 1923

John S. Adams INVENTOR

BY Victor J. Evans ATTORNEY

WITNESS

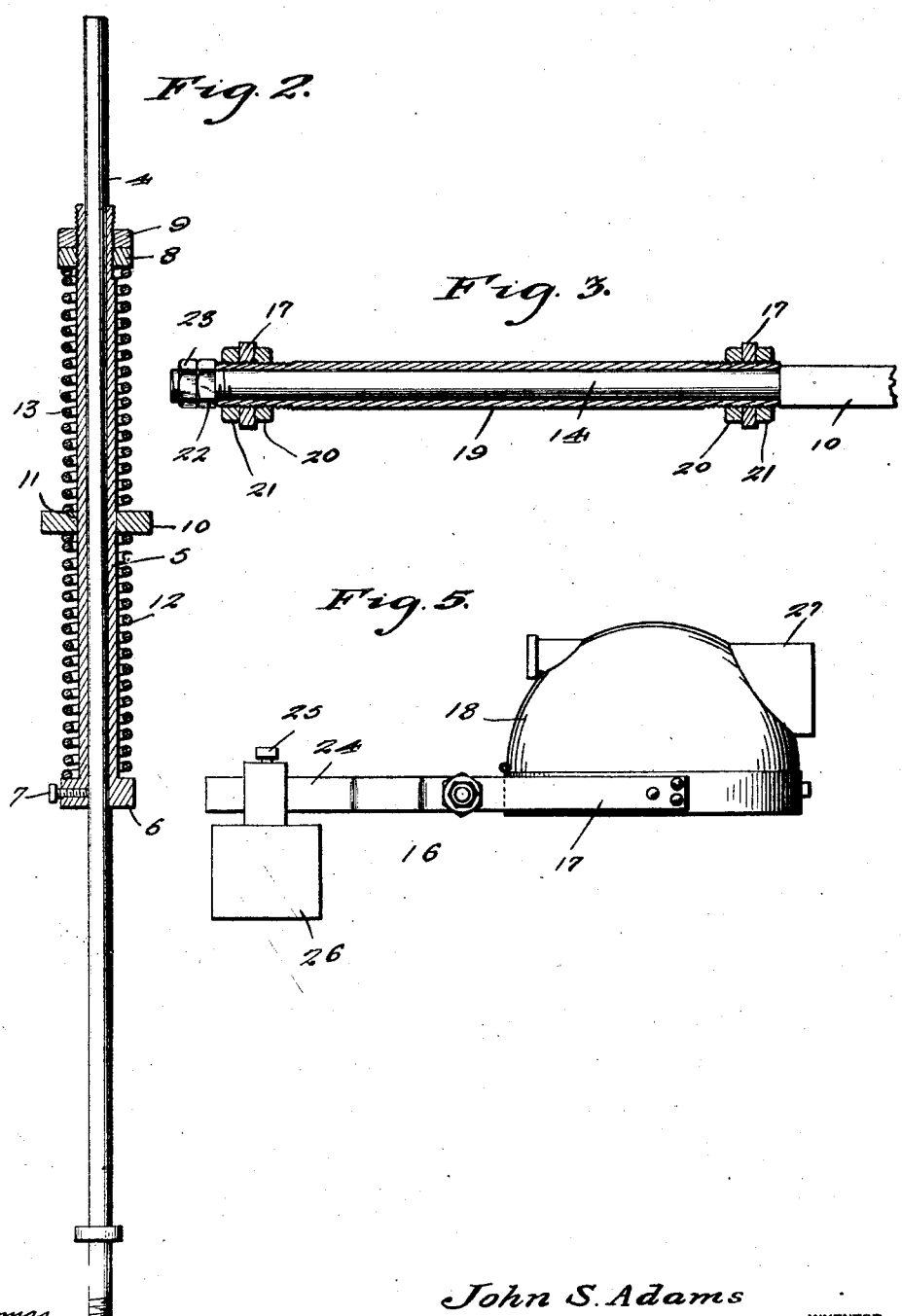

Patented June 9, 1925.

1,540,871

UNITED STATES PATENT OFFICE.

JOHN S. ADAMS, OF POMONA, CALIFORNIA.

HEADLIGHT MOUNTING.

Application filed July 13, 1923. Serial No. 651,366.

*To all whom it may concern:*

Be it known that I, JOHN S. ADAMS, a citizen of the United States, residing at Pomona, in the county of Los Angeles and State of California, have invented new and useful Improvements in Headlight Mountings, of which the following is a specification.

My present invention has reference to a headlamp mount for automobiles or similar vehicles.

An important object is to produce a means whereby the headlamps will be yieldably supported so that the lighting means therein will not be affected by irregularity in road conditions over which the vehicle passes.

A further important object is to yieldably support headlamps for automobiles in a manner whereby the lighting means will not be affected by the shocks and jars to which the car is subjected so that gasoline or like agent may be employed in the lighting system.

A further object is the provision of horizontally arranged frames each having an outer forked end between the arms of which headlamps are secured, whereby the rays of light from the lamp will be directed downwardly, the said frames being centrally secured on a yieldable support and having on their rear or inner ends adjustable counterbalancing weights for the headlamps. The said weights, if desired, may be in the nature of casings in which is stored gasoline or like agent that may be employed in the lighting system.

A still further object is to mount the headlamps of an automobile or like vehicle so that the lenses will be directed toward the ground and not in front of the machine as is usual, and wherein the headlight casings have their front faces provided with an opening covered by a translucent plate through which the rays of light from the lamp will be diffused to serve as a warning of the approach of the vehicle, the downwardly directed rays of light also serving for this purpose as well as for showing the driver of the machine the road conditions.

To the attainment of the foregoing, and other objects which will present themselves as the nature of the invention is better understood, reference is to be had to the drawings which accompany and which form part of this application.

In the drawings:—

Figure 2 is a sectional view on the line 2—2 of Figure 1.

Figure 3 is a sectional view on the line 3—3 of Figure 4.

Figure 5 is a side elevation thereof.

Figure 1:
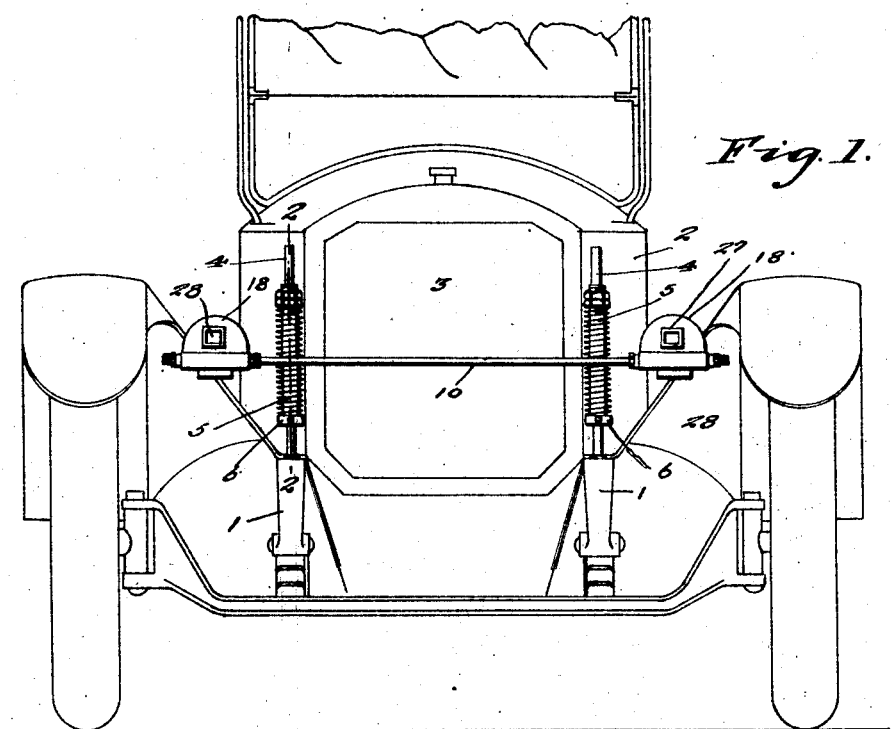
Figure 1 is a front elevation of an automobile having headlamps thereon mounted in accordance with this invention.
Figure 4:
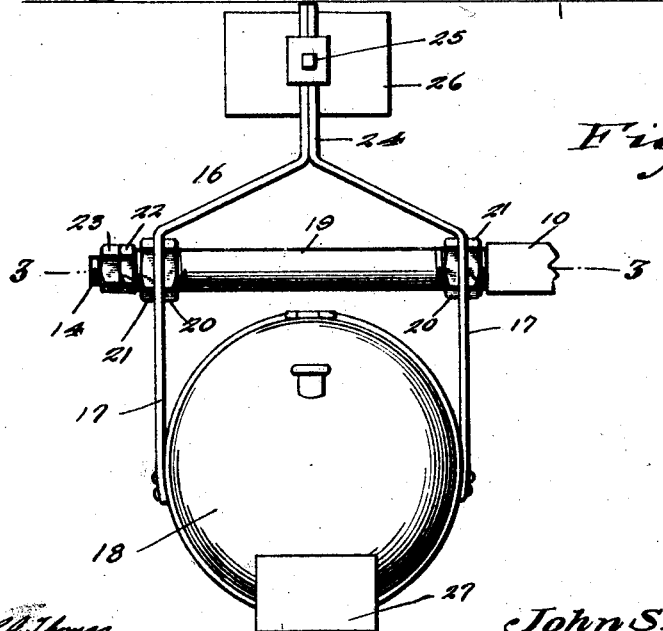
Figure 4 is a fragmentary plan view looking toward one of the headlights.

As disclosed by the drawings I secure to the side wheels 1 of an automobile 2, forward of the radiator 3, posts 4. On each post I arrange a tubular member in the nature of a sleeve 5. The lower end of each sleeve is flanged or headed, as at 6 and have passed through a threaded opening therein a bolt member 7 designed to contact the post to hold the sleeve 5 adjusted thereon. Each sleeve is threaded at its upper end to receive thereon adjustable nuts 8 and locking nuts 9 for the nuts 8. Before the nuts 8 and 9 are arranged on the sleeve 5 and the latter are properly positioned on the posts 4, I arrange over the posts and sleeves a bar 10. The bar, of course, is provided with openings 11, adjacent to its ends through which the posts and sleeves are received. Before the bar is arranged on the sleeves I position on each sleeve a helical spring 12 that rests upon the head 6 of the said sleeve, and thereafter I arrange on the sleeves a second helical spring 13 that contacts with the upper face of the bar and with the adjusting nut 8. In this manner it will be seen that the bar 10 is yieldably supported on the front of the automobile.

The bar 10 has its ends formed with projecting spindles 14 which have their outer ends threaded.

The lamp casing supported frames 16 are each preferably formed from two metal straps to include parallel arms 17 that are riveted or otherwise connected to the sides of the lamp casings 18. Through the arms 17, to the rear of the lamp casings 18 there are passed the spindle ends 14 of the bar 10. On each spindle end of the bar 10 there is a sleeve 19 provided with threaded ends, and the ends of this sleeve pass through the referred to openings in the arms 17 of the frame 16. On the ends of the sleeve 19 there are screwed bolts 20 and 21 respectively, the same being in contacting engagement with the opposed faces of the arms 17 of the frame 16. The sleeve is jammed against the shoulder provided between the bar 10 and the spindle end thereof by a nut 22 which is screwed upon the threaded outer ends of the spindles, the said nut 22 being engaged by by a lock nut 23.

The frame 16 has its arm 17 to the rear of its connection with the bar 10 inclined inwardly and brought to contacting engagement and directed rearwardly. The contacting members are disposed in a plane centrally with respect to that of the lamp casing 18, and as indicated by the numeral 24. On the straight rear portion of each frame 16 there is adjustably secured by means 25 a counter-balancing weight member 26 for the lamp casing 18 and for the frame 16. The counter-balancing weight may be in the nature of a hollow member to afford a tank for gasoline or similar ignitible fluid when the latter is employed as a lighting agent for the lamps in the casings 18.

The casings 18 have their lens faces directed downwardly, but the said casings are also provided on their front faces with substantially rectangular openings covered by a rectangular extension 27, and in each of the said extensions 27 there is a translucent plate 28 through which rays of light from the lamps will be projected. The major rays will, of course, be directed through the lens of the lamp casings and the rays passing through the translucent plates 28 serve as a warning to approaching vehicles, the remaining rays serving for a like purpose, but also to acquaint the driver of the machine with ground conditions immediately ahead of his vehicle.

As my improved device yieldably supports the lamps in such manner that the same are not affected by road conditions, I have found, and as previously inferred, that I may safely employ gasoline or a kindred fluid as a lighting agent, and it is thought that the foregoing description, when taken in connection with the drawings will fully set forth the construction and advantages of the improvement to those skilled in the art to which such inventions relate, it being understood, however, that I am entitled to make such changes therefrom as fall within the scope of what I claim.

By adjusting the nuts 20 and 21 the frames 16 may be swung to desired angles on the sleeve 19 when it is found desirable to direct the rays of light from the lamps in the casings in other than a downward direction.

Having described the invention, I claim:—

1. A headlight mounting for automobiles comprising posts fixed thereon, a sleeve adjustably arranged on each post, a bar loosely mounted on the sleeves, spring means carried by the sleeves contacting the opposed faces of the bar, means for adjusting the tension of said spring means, and headlamp supporting means journaled on the ends of the bar and fixed thereto.

2. A headlight mounting for automobiles comprising posts fixed thereon, sleeves slidably arranged on the posts, binding means between the sleeves and posts for sustaining the sleeves adjustably fixed on the posts, a bar having spindle ends received on the sleeves, upper and lower springs in contacting engagement with the opposed faces of the bar, means adjustable on the sleeves contacting the upper springs for regulating the tension of both springs, headlamp carrying frames journaled on the spindles, and means on said spindles contacting said frames for holding the same revolubly adjusted thereon.

3. A headlight mounting for automobiles comprising spaced posts fixed thereon, a bar slidably arranged on the posts, compensating spring means fixed on the posts and contacting with the opposed sides of the bar, headlight supporting means at the ends of the bar, and means for vertically adjusting said bar, supporting and spring means on the posts as a unit.

4. A headlight mounting for automobiles comprising spaced posts fixed thereon, a bar slidably arranged on the posts, compensating spring means fixed on the posts and contacting with the opposed sides of the bar, headlight supporting means at the ends of the bar, and means between said supporting means and the bar for holding the former revolubly adjusted on the bar.

5. A headlight mounting for automobiles comprising spaced posts fixed thereon, a bar slidably arranged on the posts, compensating spring means fixed on the posts and contacting with the opposed sides of the bar, spindles on the ends of the bar, headlight supporting means journaled on the spindles, and means for holding the supporting means adjustably fixed on the spindles.

6. A headlight mounting for automobiles including a post fixed thereon, a vertically adjustable sleeve mounted on the post, a bar slidably mounted on the sleeve, headlight supporting means on the bar, and compensating springs on the sleeve above and below the bar and engaging the same.

7. A headlight mounting for automobiles comprising posts fixed thereon, vertically adjustable sleeves mounted on the posts, a bar slidably mounted on the sleeves, headlight supporting means at the ends of the bar, compensating springs on the sleeves above and below the bar and engaging the same, and a common means on each sleeve for adjusting the tension of both springs thereon.

In testimony whereof I affix my signature.

JOHN S. ADAMS.